United States Patent [19]

Piltingsrud

[11] 4,115,141

[45] Sep. 19, 1978

[54] PROCESS FOR THE PREPARATION OF PIGMENTARY BRIGHT PRIMROSE YELLOW BISMUTH VANADATE

[75] Inventor: Douglas Howard Piltingsrud, Waverly, Tenn.

[73] Assignee: E. I. Du Pont de Nemours and Company, Wilmington, Del.

[21] Appl. No.: 794,392

[22] Filed: May 9, 1977

Related U.S. Application Data

[63] Continuation-in-part of Ser. No. 698,694, Jun. 22, 1976, abandoned.

[51] Int. Cl.$^2$ .............................................. C09C 1/00
[52] U.S. Cl. ................................. 106/288 B; 423/593
[58] Field of Search ........................... 106/288 B, 309; 423/593

[56] References Cited

FOREIGN PATENT DOCUMENTS 422,947  1925  Fed. Rep. of Germany.

OTHER PUBLICATIONS

H. E. Swanson et al., Standard X-Ray Diffraction Powder Patterns, National Bureau of Standards Report, No. 7592, Aug. 1962.

R. S. Roth et al., Synthesis and Stability of Bismutotantalite, Stibiotantalite and Chemically Similar ABO$_4$ Compounds, *The American Mineralogist*, vol. 48, (Nov.-Dec. 1963), pp. 1348-1356.

I. M. Gottlieb et al., Preparation and Thermal Properties of Bismuth Orthovanadate, *Thermal Analysis*, vol. 2, Proceedings Third ICTA DAVOS 1971, pp. 303-311.

I. M. Gottlieb and D. P. Kelly, Further Studies on the Preparation and Thermal Properties of Bismuth Orthovanadate, *Thermal Analysis*, vol. 1, Proceedings Fourth ICTA Budapest, (1974), pp. 675-679.

*Primary Examiner*—Winston A. Douglas
*Assistant Examiner*—J. V. Howard

[57] ABSTRACT

Process for the preparation of pigmentary primrose yellow bismuth vanadate by reacting bismuth nitrate with an alkali vanadate under controlled conditions to obtain a bismuth vanadate gel which is then subjected to aqueous digestion to produce pigmentary monoclinic bismuth vanadate.

24 Claims, No Drawings

PROCESS FOR THE PREPARATION OF PIGMENTARY BRIGHT PRIMROSE YELLOW BISMUTH VANADATE

CROSS REFERENCE TO RELATED APPLICATIONS

This application is a continuation-in-part of application Ser. No. 698,694, filed June 22, 1976, now abandoned.

BACKGROUND OF THE INVENTION

Bismuth vanadate occurs in nature in an orthorhombic form commonly called pucherite. Pucherite is a dull yellow-brown mineral, which is not useful as a pigment. Pucherite is similar in color to limonite, a dull yellow-brown iron oxide, which has never been produced as a bright, high intensity pigment despite repeated attempts.

Various references have described the synthetic preparation of bismuth vanadate, for example, I. M. Gottlieb and C. R. Rowe, "Preparation and Thermal Properties of Bismuth Orthovanadate", *Thermal Analysis,* Vol. 2, Proceedings Third ICTA DAVOS (1971), pp. 303–311; R. S. Roth and J. W. Waring, "Synthesis and Stability of Bismutotantalite, Stibiotantalite and Chemically Similar $ABO_4$ Compounds", *The American Mineralogist,* Vol. 48 (Nov. – Dec., 1963), pp. 1348–56; H. E. Swanson et al., "Standard X-Ray Diffraction Powder Patterns", *National Bureau of Standards Report,* No. 7592 (Aug., 1962); Eduard Zintl and Ludwig Vanino, "Process For The Manufacture Of Pure Bismuth Vanadate"; German Pat. No. 422,947 (1925). However, as in the case of yellow iron oxide, none of the above references provide a process which is successful for use in the preparation of bismuth vanadate which is useful as a bright yellow pigment.

SUMMARY OF THE INVENTION

The present invention relates to a process for preparing pigmentary bismuth vanadate which process comprises mixing a solution of $Bi(NO_3)_3.5H_2O$ in nitric acid with a solution of alkali vanadate in an aqueous base selected from sodium hydroxide and potassium hydroxide, to precipitate a bismuth vanadate gel suspended in a solution containing dissolved alkali nitrate, wherein the molar ratio of $Bi^{3+}$ to $VO_4^{3-}$ is from about 0.90:1.00 to about 1.10:1.00 and wherein the normalities of the acid and base solutions are adjusted prior to mixing so that the pH of the mixture will be from about 1.0 to about 11.0, preferably from about 1.5 to 4.0; adjusting the pH of the suspension to about 2.2–6.0 with an aqueous base selected from sodium hydroxide and potassium hydroxide if the pH is less than about 2.2, or with an acid selected from nitric acid or sulfuric acid if the pH is greater than about 6.0; removing the gel from the suspension; washing the gel with water until it contains about 10 percent or less alkali nitrate, based on the theoretical yield of bismuth vanadate; heating the gel in water at about 60°–200° C. for at least 0.2 hour; holding the pH within the range of from about 2.2 to 6.0 with an aqueous base selected from sodium hydroxide and potassium hydroxide if the pH is less than about 2.2 or with an acid selected from nitric acid, hydrochloric acid, hydrobromic acid, sulfuric acid or phosphoric acid if the pH is greater than about 6.0 to convert it to pigmentary monoclinic bismuth vanadate; adjusting the pH of the suspension to 8.0 to 9.5 with an aqueous base selected from sodium hydroxide or potassium hydroxide and maintaining the suspension at this pH at a temperature of 50°–100° C. for 15 to 30 minutes; and filtering, washing and drying the pigment.

DETAILED DESCRIPTION OF THE INVENTION

This invention relates to a process for the preparation of pigmentary monoclinic bismuth vanadate. By "pigmentary" is meant a bismuth vanadate which is bright primrose yellow, single phase monoclinic crystalline as determined by X-ray diffraction, having high intensity, good strength and good lightfastness.

As indicated, pigmentary bismuth vanadate is entirely in the monoclinic crystal phase as determined using X-ray diffraction. X-ray diffraction measurements are made with a Debye-Scherrer powder camera using $Cu_{K\alpha}$ radiation from a Norelco Type 12045B unit at 40 kV/20mA and a 6-hour exposure.

The bismuth vanadate of the present invention exhibits a large increase in reflectance in the range of the visible spectrum from 450 to 525nm which shows that it is primrose yellow in color and has high intensity and good strength. Reflectance is used herein as a comparison of the specular and diffuse reflectance of a known standard with the sample to be tested using Type I illumination. Reflectance is measured on a Cary Model 14 spectrophotometer equipped with an integrating sphere, painted with Eastman white reflectance paint No. 6080. The sample to be tested is prepared by mixing 10 weight percent of the bismuth vanadate of the present invention with 90 weight percent of barium sulfate, Eastman Reflectance Standard No. 6091, until a uniform powder is obtained. Then the reflectance of the known standard, Eastman Reflectance Standard No. 6091, is compared with that of the sample. In the range of the visible spectrum from 450 to 525 nm, the sample containing the bismuth vanadate of the present invention exhibits an increase of at least about 65 reflectance units on a scale in which the Eastman Reflectance Standard No. 6091 exhibits a reflectance of 100 units over the entire visible spectrum. In fact, many of the samples exhibit increases in reflectance of at least about 70 units or greater. The greater the magnitude of the change in reflectance within the specified spectral range, the greater the intensity and strength of the sample.

The intensity and lightfastness of pigmentary bismuth vanadate in a paint are measured from paint drawdowns made to complete hiding. The paint is made by dispersing the pigment into a binder in a 2:1 ratio by weight of pigment to binder using a Hoover muller. The binder is composed of 98.9 weight percent #2 transparent varnish made by Superior Varnish and Drier Company, Merchantsville, N.J.; 1 weight percent, as lead, of lead Nuodex ® drier (contains 24% lead), and 0.1 weight percent, as manganese, of manganese Nuodex ® drier (contains 6% manganese). The drawdowns are dried for about 72–120 hours in a well-ventilated room at 25° C. and less than about 50% humidity.

Intensity is determined by the green filter reflectance of a masstone drawdown. Intensity is expressed as a percent of green filter reflectance measured with a Gardiner Multipurpose Reflectometer, Serial. No. 40, (Gardiner Laboratory, Inc., Bethesda, MD), using a white reflectance standard at a setting of 86.1 and light from a General Electric CVS projector lamp passed through the green tristimulus filter supplied with the Gardiner Reflectometer. The Gardiner Multipurpose Reflectometer is described in National Bureau of Standards Research Paper RP 1345, dated Nov., 1940, by Richard S. Hunter, and National Bureau of Standards Circular C429, dated July 30, 1942, by Richard S. Hunter. The higher the percent reflectance of the drawdown, the more intense the color. The intensity of the bismuth vanadate of the present invention is such that it has a green filter reflectance of at least about 60 percent.

Lightfastness is determined after the dried paint drawdowns have been continuously exposed for 44 hours in an Atlas Color Fade-Ometer ® Type FDA-P. A Gardiner Multipurpose Reflectometer is used as described above to measure green filter reflectance before and after exposure. Measurements are taken within one hour prior to exposure and again within one hour after exposure. The percent lowering of reflectance after exposure based on initial reflectance is percent Fade-Ometer ® darkening. The lower the percent Fade-Ometer ® darkening, the better the lightfastness of the pigment. The bismuth vanadate of the present invention will generally exhibit a percent Fade-Ometer ® darkening of about 11 percent or less, preferably about 7 percent or less, after 44 hours of exposure.

The surface area of the bismuth vanadate is about 2–22 $m^2/g$. For use in film forming compositions, such as paints and inks, a surface area of about 8–22 $m^2/g$. is preferred. For use in plastic composition, a surface area of about 2–4 $m^2/g$. is preferred because of increased heat stability. The surface area is measured on a Perkin-Elmer Shell Model 212C Sorptometer using the technique recommended by the manufacturer.

According to the process of this invention pigmentary bismuth vanadate is prepared by mixing a solution of up to about 0.8M $Bi(NO_3)_3.5H_2O$ in up to about 4.0N nitric acid, preferably about 0.2M $Bi(NO_3)_3.5H_2O$ in about 1.0N nitric acid, with a solution of alkali vanadate (sodium vanadate or potassium vanadate), preferably up to about 0.32M $Na_3VO_4$, in up to about 1.6N aqueous base selected from sodium hydroxide or potassium hydroxide, more preferably about 0.2M $Na_3VO_4$ in about 1.0N sodium hydroxide. Upper concentration limits for the reactant solutions are determined by solubility; however, control of equimolar incremental mixing is easier with more dilute solutions. The temperature of mixing is not critical and mixing can be carried out at temperatures of from 10° to 100° C. but it is preferred that the solutions be mixed at 20° to 30° C.

The molar ratio of $Bi^{3+}$ to $VO_4^{3-}$ can be about 0.90:1.00 to 1.10:1.00, preferably about 0.98:1.00 to 1.05:1.00, which indicates that either an excess of $Bi^{3+}$ or $VO_4^{3-}$ is allowable. The symbol $VO_4^{3-}$ is used herein to denote a pentavalent vanadium species in an aqueous solution, but it does not mean a specific pentavalent vanadium species present at a given pH and vanadium concentration.

The normalities of the acid and base solutions are adjusted prior to mixing so that the pH of the reaction mixture will be about 1.0–11.0. A pH of about 1.5–4.0 is preferred because it yields a gel from which a pigmentary monoclinic bismuth vanadate product having optimum intensity and/or lightfastness can be obtained.

The preferred method of mixing the solutions is in a flow reactor which gives a very rapid incremental combination under high turbulence conditions. Incremental combination means that small, essentially stoichiometric quantities are reacted at one time. This prevents relatively large gradients and stoichiometric imbalance that result when large quantities of reactants are mixed at once. Such imbalance results in undesirable side reactions. Apparatus which conveniently achieve this result are tee mixers or flow reactors.

When the solutions of $Bi(NO_3)_3.5H_2O$ and alkali vanadate are mixed under the above conditions, a suspension of bismuth vanadate gel in alkali nitrate (sodium nitrate, potassium nitrate, or both) solution is formed. Bismuth vanadate gel as used herein means a hydrous, X-ray amorphous bismuth vanadate precipitate containing occluded water.

The gel should not be removed from the suspension until the pH of the suspension has been stabilized at about 2.2–6.0, preferably about 3.0–3.5. Thus, if the pH of the suspension is less than about 2.2, it may be adjusted upward with aqueous sodium hydroxide or potassium hydroxide, and if it is greater than about 6.0, it may be adjusted downward with an acid selected from nitric acid or sulfuric acid. Prompt adjustment of the pH of the suspension to the final range listed above is advisable, although under certain circumstances the bismuth vanadate gel is stable for up to several hours at room temperature prior to pH adjustment.

The gel is then removed from the suspension, preferably by filtration. The gel is collected and, if it contains more than about 10 percent alkali nitrate based on the theoretical yield of bismuth vanadate, the gel must be washed with water until it contains about 10 percent or less.

When an excess of vanadium is used in the formation of the gel, the gel must be washed prior to the above aqueous digestion to remove any alkali nitrate in excess of 10 percent by weight based on the theoretical yield of bismuth vanadate. The suspension containing the gel is then heated at a temperature of from about 60° C. to about 200° C. for at least 0.2 hour, and preferably at a temperature of from 90° C. to about 100° C. for about one to two hours to convert the gel to pigmentary monoclinic bismuth vanadate. During the aqueous digestion the pH of the suspension must be maintained at a pH of from 2.2 to 6.0, and preferably from a pH of 3.0 to 3.5, by adding a suitable acid or base as needed. Acids suitable for use include nitric, sulfuric, hydrochloric, hydrobromic or phosphoric. Based suitable for use include aqueous sodium hydroxide or potassium hydroxide. It will be understood that if temperatures above about 100° C. are used, the heating must be carried out under pressure. In addition, when the ratio of Bi to $VO_4$ is 0.9:1 to 1.0:1.0, the digested pigment must be washed after the heating step by suspending it in water for 15 to 30 minutes at 50° C. to 100° C. while holding the pH at 8.0 to 9.5 with an aqueous base selected from sodium hydroxide and potassium hydroxide. Preferably the digested pigment will be washed in water for 15 minutes at 70° C. while holding the pH at 9.0 with an aqueous base selected from sodium hydroxide and potassium hydroxide. When a molar excess of bismuth is used in the formation of the gel, it is not necessary to reduce the alkali nitrate content of the gel prior to digestion, although removal or reduction of the alkali nitrate from the gel prior to digestion is permissible.

After digestion is complete the pigment is filtered, washed and dried, e.g., at about 130° C. The product is bright primrose yellow bismuth vanadate which is entirely in the monoclinic phase as identified by X-ray diffraction.

In the process as described above the pH adjustment can be made after the gel has been removed from the suspension. However, in order to easily adjust the pH of the gel, the gel should be resuspended in water. Once the pH of the gel has been properly adjusted, the gel under certain circumstances is stable for up to about a week at room temperature.

It is possible to prepare the alkali vanadate solution by dissolving a pentavalent vanadium compound such as $V_2O_5$, $Na_3VO_4$, $Na_4V_2O_7$, $NaVO_3$, or $K_3VO_4$ in an aqueous base selected from sodium hydroxide and potassium hydroxide.

After the bismuth vanadate pigment has been prepared by the process of this invention, its lightfastness may be improved by encapsulation in a dense amorphous coating of silica or a treatment with aluminum pyrophosphate. Coatings can be applied in accordance with known processes, such as those taught in U.S. Pat. No. Re 27,818 (reissue of U.S. Pat. No. 3,437,502) to Werner; U.S. Pat. No. 3,639,133 to Linton; U.S. Pat. No. 3,370,971 to Linton; and of U.S. Pat. No. 3,885,366 to Iler.

EXAMPLE 1

A mixture is prepared by combining the following ingredients in a mixing tee:
 (i) $Bi(NO_3)_3 \cdot 5H_2O$ (10.93 lb.) dissolved in 12.78 l. of 4.0N $HNO_3$, then diluted to 51.1 l. with water, and
 (ii) $V_2O_5$ (2.05 lb.) dissolved in 31.94 l. of water containing 7.210 lb. NaOH, then diluted to 51.1 l. with water to give a solution of sodium vanadate plus sodium hydroxide.

The mixing tee has inside diameters of 0.118 in. for the bismuth nitrate opening, 0.192 in. for the sodium vanadate opening, and 0.192 in. for the exit. The bismuth nitrate enters on the leg. The solutions are mixed in about 15 minutes when a pressure of about 15 psi is applied across the tee. Sufficient $HNO_3$ is added to ingredient (i) or aqueous NaOH to ingredient (ii) so that the pH of the mixture of the two will be about 1.5 to 2.0. The mixture is squirted into a 45 gal. tank containing 7 gal. of water which has been adjusted to a pH of 2.2 with $HNO_3$. The contents of the tank are stirred for several minutes, and the pH is adjusted to 3.2 with 2.0N NaOH. The contents are then stirred for 15 minutes, filtered, and washed with 20 gal. of water and refiltered. The bismuth vanadate gel is collected from the filter cloth, and is stirred into a tank containing 70 lb. of water, which has been adjusted to a pH of 3.1 with $HNO_3$. The contents of the tank are heated to 95° C. in about 40 minutes and held at that temperature and a pH of 3.1 for 120 minutes. The product, pigmentary bismuth vanadate, is isolated by filtration, washed twice with 20 gal. of water, and dried at 140° C.

The above procedure is repeated four times to yield about 28 lb. of pigment. Twenty-five pounds of the pigment are dispersed in 104 lb. of water containing 567 g. of Fischer 28% sodium silicate solution (40°-42° Baume) by passing it through a Gaulin Submicron Homogenizer, first at 2000 psi, and again at 5000 psi. The mixture is then heated to and held at 90° C. and adjusted to a pH of 9.6 with 2.0N NaOH. A solution of 14.497 lb. of Fischer 28% sodium silicate in 62.5 lb. of water is added to the mixture over a four-hour period. At the same time, a dilute sulfuric acid solution (2.299 lb. of concentrated sulfuric acid in 71.25 lb. of water) is added to the mixture at a rate such that the pH of the mixture drops to 9.4 in about 45 minutes. The pH of the mixture is immediately raised to 9.6 with 2.0N NaOH. This pH control procedure is continued over the four-hour silicate addition period.

After the four-hour addition perod, the pH is reduced to 9.0 with $H_2SO_4$, held there for 60 minutes, and then reduced to 7.0. Then, while the mixture is still at 90° C., a solution of 3.75 lb. of $Al_2(SO_4)_3 \cdot 18H_2O$ in 15 b. of water is added over a ten-minute period and the pH falls to 2.0-3.0. The pH is then raised to 6.0 with 2.0N NaOH in about 20 minutes. The product is filtered hot, washed twice with 30 gal. of water and dried at 140° C. Chemical analysis and electron micrographs show that the pigment particles have been coated with silica. Intensity and lightfastness measurements on the pigment before and after coating are shown in Table I.

TABLE I

| Before Coating | | After Coating | |
| --- | --- | --- | --- |
| Intensity % Green Filter Reflectance | Lightfastness[1] % Fade-Ometer® Darkening | Intensity % Green Filter Reflectance | Lightfastness[1] % Fade-Ometer® Darkening |
| 67.9 | 6.0 | 67.4 | 2.4 |

[1] Percent reflectance change after 44 hours of Fade-Ometer® exposure

This example shows that encapsulating bismuth vanadate pigment with silica improves its lightfastness as determined by Fade-Ometer® exposures.

EXAMPLE 2

A mixture is prepared by combining the following ingredients in a 1 mm ID mixing tee at 40 psi over a period of about two minutes:
 (i) $Bi(NO_3)_3 \cdot 5H_2O$ (166.0 g.) dissolved in 800 ml. of 2.0N $HNO_3$ and diluted to 1610 ml. with water, and
 (ii) $Na_3VO_4$ (60.66 g.) dissolved in 1610 ml. of 1.0N NaOH.

Sufficient $HNO_3$ is added to ingredient (i) or aqueous NaOH to ingredient (ii) so that the pH of the mixture of the two will be about 1.5-2.0. The mixture is squirted into a large beaker containing 1200 ml. of water adjusted to a pH of 2.7 with $HNO_3$. The contents of the beaker are stirred and the pH is adjusted to 3.4 with 0.5N NaOH. The contents are then stirred for 10 minutes, filtered, washed with 1000 ml. of water, and refiltered. A bismuth vanadate gel is collected from the filter paper, is stirred into a beaker containing 3000 ml. of water, is brought to a boil, is adjusted to a pH of 3.0-3.5 using $HNO_3$ or NaOH and is held at that temperature and pH for 120 minutes. The product, bismuth vanadate pigment, is isolated by filtration, washed by suspending in 1000 ml. of water, refiltering, and finally suspended in 2400 ml. of water.

The suspension is then heated to 85° C. and aluminum sulfate (18.0 g. $Al_2(SO_4)_3 \cdot 18H_2O$ in 240 ml. water) is added. The pH of the suspension is adjusted to 4.0 with 1.0N NaOH, the sodium pyrophosphate (6.0 g. in 120 ml. of water) and aluminum sulfate (6.0 g. $Al_2(SO_4)_3 \cdot 18H_2O$ in 120 ml. of water) are added to the suspension. The pH is adjusted to 7.0 with aqueous NaOH over a thirty-minute period. The suspension is filtered, washed and dried at 110° C. to yield an aluminum phosphate coated yellow pigment. Intensity and lightfastness before and after coating are shown in Table II.

TABLE II

| Before Coating | | After Coating | |
|---|---|---|---|
| Intensity % Green Filter Reflectance | Lightfastness[1] % Fade-Ometer® Darkening | Intensity % Green Filter Reflectance | Lightfastness[1] % Fade-Ometer® Darkening |
| 66.1 | 6.7 | 64.9 | 3.9 |

[1]Percent reflectance change after 44 hours of Fade-Ometer® exposure

This example shows that treatment of bismuth vanadate pigment with aluminum phosphate improves lightfastness as determined by Fade-Ometer ® exposures.

EXAMPLE 3

A mixture is prepared by combining the following ingredients in a 1 mm ID mixing tee at 40 psi over a period of about two minutes:
 (i) $Bi(NO_3)_3.5H_2O$ (40.0 g.) dissolved in 200 ml. of 2.0N $HNO_3$, then diluted to 405 ml. with water, and
 (ii) $Na_3VO_4$ (15.16 g.) dissolved in 200 ml. of 2.0N NaOH, then diluted to 400 ml. with water.

Sufficient $HNO_3$ is added to ingredient (i) or aqueous NaOH to ingredient (ii) so that the pH of the mixture of the two will be about 1.5 to 2.0. The mixture is squirted into a 4-liter beaker containing 1200 ml. of water which has been adjusted to a pH of 3.0 with $HNO_3$. The contents of the beaker are stirred for one minute and the pH is adjusted to 3.4 with 0.5N NaOH. The mixture is than stirred for 15 minutes, filtered, washed with 500 ml. of water, and refiltered. A bismuth vanadate gel (Sample A) is collected from the filter paper, and is stirred into a beaker containing 1600 ml. of water and the pH of the mixture is adjusted to 3.3 to 3.4 with HBr or NaOH. The mixture is boiled for 90 minutes while the pH is held at 3.3 to 3.4. A bismuth vanadate pigment is isolated by filtration, washed with 1000 ml. of water, and heated to 130° C. until dry.

Sample B is prepared according to the procedure used for Sample A except that 42.0 g., instead of 40.0 g., of $Bi(NO_3)_3.5H_2O$ is used.

Sample C is prepared by combining the following ingredients in a 1 mm ID mixing tee at 40 psi over a period of about 2 minutes:
 (iii) $Bi(NO_3)_3.5H_2O$ (88.0 g.) dissolved in 52 ml. of concentrated $HNO_3$ and 400 ml. of water, then diluted to 800 ml. with water, and
 (iv) $V_2O_5$ (15.0 g.) dissolved in 600 ml. of water containing 53.0 g. of NaOH, then diluted to 800 ml. with water to give a solution of sodium vanadate plus sodium hydroxide.

Sufficient $HNO_3$ is added to ingredient (iii) of aqueous NaOH to ingredient (iv) so that the pH of the mixture of the two will be about 1.5 to 2.0. The mixture is squirted into a 4-liter beaker containing 1200 ml. of water which has been adjusted to a pH of 2.2 with $HNO_3$. The contents of the beaker are stirred for one minute and the pH is adjusted to 3.3 with 0.5N NaOH. The mixture is then stirred for 15 minutes, filtered, washed with 500 ml. of water, and refiltered. A bismuth vanadate gel is collected from the filter paper and is stirred into a beaker containing 500 ml. of water. The pH of the mixture is adjusted to 3.3 to 3.4 with $HNO_3$ or NaOH and is boiled for 90 minutes while the pH is kept constant at 3.3 to 3.4. A bismuth vanadate pigment is isolated by filtration, washed with 500 ml. of water, and heated at 130° C. until dry.

Sample D is prepared according to the procedure used for Sample A, except that 46.0 g., instead of 40.0 g., of $Bi(NO_3)_3.5H_2O$ is used.

Sample E is prepared by combining the following ingredients in a 1 mm ID mixing tee at 40 psi over a period of 2 minutes.
 (v) $Bi(NO_3)_3.5H_2O$ (72.0 g.) dissolved in 56 ml. concentrated $HNO_3$ and 400 ml. water, then diluted to 800 ml. with water, and
 (vi) $V_2O_5$ (15.0 g.) dissolved in 600 ml. water containing 53.30 g. NaOH, then diluted to 800 ml. with water to give a solution of sodium vanadate plus sodium hydroxide.

Sufficient $HNO_3$ is added to ingredient (v) or aqueous NaOH to ingredient (vi) so that the pH of the mixture of the two will be about 1.5 to 2.0. The mixture is squirted into a 4-liter beaker containing 1200 ml. of water which has been adjusted to a pH of 2.2 with $HNO_3$. The contents of the beaker are stirred for one minute and the pH is adjusted to 3.3 with 0.5N NaOH. The mixture is then stirred for 15 minutes and filtered. A bismuth vanadate gel is collected from the filter paper. The gel is stirred into a beaker containing 500 ml. of water and the pH of the mixture is adjusted to 3.1 with $HNO_3$ or NaOH. The mixture is boiled for 120 minutes while its pH is held at 3.1. The bismuth vanadate pigment is isolated by filtration and resuspended in 400 ml. of water. The temperature is then raised to 50° C. and the pH raised to 8.0 and held there for 10 minutes. A bismuth vanadate pigment is isolated by filtration, washed with 500 ml. of water, and heated to 130° C. until dried.

TABLE III

| Samples | $Bi^{3+}$ to $VO_4^{3-}$ Molar Ratio | Intensity % Green Filter Reflectance | Lightfastness[1] % Fade-Ometer® Darkening |
|---|---|---|---|
| Aqueous | | | |
| A | 1.00/1.00 | 71.2 | 4.5 |
| B | 1.05/1.00 | 69.0 | 6.4 |
| C | 1.10/1.00 | 73.9 | 8.0 |
| D | 1.15/1.00 | 74.2 | 14.5 |
| E | 0.90/1.00 | 61.7 | 4.7 |

[1]Percent reflectance change after 44 hours of Fade-Ometer® exposure

EXAMPLE 4

A mixture is prepared by combining the following ingredients in a mixing tee:
 (i) $Bi(NO_3)_3.5H_2O$ (10.731 lbs.) dissolved in 12.78 liters of 4.0N $HNO_3$, then diluted to 51.1 liters with water, and
 (ii) $V_2O_5$ (2.049 lb.) dissolved in 31.94 liters of water containing 7.210 lb. NaOH, then diluted to 51.1 liters with water, to give a solution of sodium vanadate plus sodium hydroxide.

The mixing tee has inside diameters of 0.118 in. for the bismuth nitrate opening, 0.192 in. for the sodium vanadate opening, and 0.192 in. for the exit. The bismuth nitrate enters on the leg. The solutions are mixed in about 15 minutes when a pressure of about 15 psi is applied across the tee. Sufficient $HNO_3$ is added to ingredient (i) or aqueous NaOH to ingredient (ii) so that the pH of the mixture of the two will be about 1.5 to 2.0. The mixture is squirted into a 45 gal. tank containing 7 gal. of water which has been adjusted to a pH of 2.2 with $HNO_3$. The contents of the tank are stirred for several minutes, and the pH is adjusted to 3.2 with 2.0N NaOH. The contents are then stirred for 15 minutes, filtered and washed with 20 gal. of water and refiltered.

Seven 100 g. samples of the gel are respectively suspended in seven 300 ml. portions of water. The suspensions are heated to a boil and held at that temperature for two hours. The pHs of the suspensions are brought to the values shown in Table IV for samples A to G by additions of $HNO_3$ or aqueous NaOH, as necessary, and held there during the two-hour boiling period. All the samples are then filtered, resuspended in 200 ml. of water, refiltered and dried at 130° C.

The crystal phase, intensity and lightfastness for the samples are given in Table IV.

TABLE IV

| Sample | pH | Phase | Intensity % Green Filter Reflectance | Lightfastness[1] % Fade-Ometer® Darkening |
| --- | --- | --- | --- | --- |
| A | 1.0 | Tetra & Mono | 43.5 | 38.9 |
| B | 1.4 | Tetra & Mon. | 55.7 | 30.7 |
| C | 2.0 | Mono & 2nd Phase | 52.8 | 7.8 |
| D | 2.4 | Monoclinic | 64.3 | 6.5 |
| E | 3.1 | Monoclinic | 67.0 | 3.2 |
| F | 4.0 | Monoclinic | 60.4 | 7.9 |
| G | 8.0 | Mono & 2nd Phase | 62.0 | 8.4 |

[1] Percent reflectance change after 44 hours of Fade-Ometer® exposure

EXAMPLE 5

A mixture is prepared by combining the following ingredients in a mixing tee:
(i) $Bi(NO_3)_3.5H_2O$ (277.5 g) dissolved in 694.3 ml of 4.1N $HNO_3$ and diluted to 2750 ml with water.
(ii) $V_2O_5$ (51.6 g) dissolved in 1718 ml of water containing 178 g of NaOH, then diluted to 2750 ml to give a solution of sodium vanadate plus sodium hydroxide.

Sufficient $HNO_3$ is added to ingredient (i) or aqueous NaOH to ingredient (ii) so that the pH of the mixture of the two will be about 1.5–2.0. The mixture is squirted into a strike jar containing 1500 ml of water which has been adjusted to a pH of 2.2 with $HNO_3$. The mixture is stirred and the pH adjusted to 3.2 with 0.5N NaOH. The stirring is continued for 15 minutes. The pH is adjusted to 3.1 with 1N $HNO_3$ and heated to 95° C for 3 hrs. with pH kept between 2.8 and 3.5 using 0.5N NaOH or 1.0N $HNO_3$. The bismuth vanadate precipitate is filtered, washed to 2000Ω resistance and dried. The product has 66.2% green filter reflectance and 4.5% Fade-Ometer darkening.

EXAMPLE 6

A mixture is prepared by combining the following ingredients in a 1 mm ID mixing tee at a pressure of 40 psi over about a 2-minute period.
(i) $Bi(NO_3)_3.5H_2O$ (82.0g) dissolved in 400 ml of 2N $HNO_3$ then diluted with 400 ml of distilled water.
(ii) $Na_3VO_4$ (30.3g) dissolved in 400 ml of 2N NaOH and diluted with 400 ml of distilled water.

These components give a molar ratio of $Bi^{3+}$ to $VO_4^{3-}$ of 1.025:1.00.

Sufficient $HNO_3$ is added to ingredient (i) or NaOH to ingredient (ii) so that the pH of the mixture of the two will be between 1.5 and 2.0. The mixture is squirted into a 4 l beaker containing 1200 ml of distilled water which had been adjusted to a pH of 2.7 with $HNO_3$. The mixture is stirred and adjusted to pH = 3.4 with 0.5N NaOH and stirred at room temperature for 10 minutes. The suspension is filtered and washed. The bismuth vanadate gel is converted to monoclinic bismuth vanadate by hydrothermal digestion at pH 3.0 to 3.5 at 100° C. Twelve-month Florida exposure in thermosetting acrylic lacquer showed good performance versus commercial yellow pigment.

EXAMPLE 7

A mixture is prepared by combining the following ingredients in a 1 mm ID mixing tee at a pressure of 40 psi over about a 2-minute period.
(i) $Bi(NO_3)_3.5H_2O$ (80.5g) dissolved in 203 ml of 4.1N $HNO_3$ and diluted to 800 ml with distilled water.
(ii) $V_2O_5$ (14.8g) dissolved in 345 ml of 2.3N (NaOH) and diluted to 800 ml with distilled water.

Sufficient, $HNO_3$ is added to ingredient (i) or NaOH to ingredient (ii) so that the pH of the final mixture is 3.2. The mixture is squirted into a 4 l beaker containing 1200 ml of distilled water which had a pH = 5.8. The suspension is stirred and pH monitored at 4.0–6.0 during most of the strike. Final pH is 3.2. The pH is adjusted immediately to 3.0 with $HNO_3$ and stirred at room temperature for 30 minutes. The suspension is filtered and washed. The gel is resuspended at pH = 3.1 and converted to monoclinic bismuth vanadate at 100° C.

Intensity of the product as measured by green filter reflectance is 67.3% and % darkening after 44 hr. Fade-Ometer exposure is 5.8%.

EXAMPLE 8

A mixture is prepared by combining the following ingredients in a 1 mm ID mixing tee at 15 psi to give a molar ratio of $Bi^{3+}$ to $VO_4^{3-}$ of 0.95:1.00.
(i) $Bi(NO_3)_3.5H_2O$ (76.0 g) dissolved in 400 ml of 2N $HNO_3$ and diluted to 800 ml.
(ii) $V_2O_5$ (15.0 g) dissolved in 600 ml of distilled water containing 52.0 g NaOH and diluted to 800 ml to give a solution of sodium vanadate and sodium hydroxide.

Sufficient $HNO_3$ is added to ingredient (i) or NaOH to ingredient (ii) so that the pH of mixture will be between 1.5 and 2.5. The mixture is squirted under 15 psi pressure into a 4 l beaker containing 1200 ml of distilled water adjusted to pH 2.2 with dilute $HNO_3$. The contents of the beaker are stirred, after 2 minutes the pH is adjusted to 3.2 with 2N NaOH and stirred 15 minutes. About one-third of the suspended gel is removed and is designated Sample A (See Table V). The remainder is filtered and divided into 2 parts identified as Samples B and D, respectively. Sample B is filtered only and Sample D is washed once in 200 ml of distilled water.

Sample A's pH is adjusted to 3.2 and it is heated to 90°–100° C with pH maintained between 2.8 and 3.5 at a volume of 700–800 ml for 2–3 hours. After conversion of gel to crystalline material the pH is raised to 8.5 for 15 minutes with temperature >60° C. Bismuth vanadate is then filtered, washed twice and dried at 110° C.

Samples B and D are resuspended, respectively, in 700–800 ml of distilled water and pH adjusted to 3.2. Samples B and D are converted at the same temperature, time and pH as Sample A. After conversion, Sample B is divided in half. One half retains identification as Sample B, is filtered, washed and dried at 110° C. The other half is identified as Sample C, has pH adjusted to 9.0 at temperature >60° C for 15 minutes, is filtered, washed and dried at 110° C.

After conversion, Sample D is divided in half. One half retains identification as Sample D, is filtered, washed and dried. The other half is identified as Sample E and is treated in the same fashion as Sample C.

Sample F is prepared according to the procedure of Sample A except that 78.5 g of $Bi(NO_3)_3.5H_2O$ is used, giving a molar ratio of $Bi^{3+}$ to $VO_4^{3-}$ of 0.98:1.00. The gel suspension is filtered and divided in half. One half retains identification Sample F and the other half is identified as Sample G and is washed once in 250 ml of distilled water.

Sample F is converted according to the procedure of Sample A, is filtered, washed and dried at 110° C. Sample G is converted according to the procedure of Sample A, is filtered, washed and dried at 110° C.

This example shows that where the molar ratio of $Bi^{3+}$ to $VO_4^{3-}$ is less than 1.00:1.00, $NaNO_3$ concentration must be reduced below 44% and excess vanadium must be removed by washing the pigmentary bismuth vanadate with a basic solution.

EXAMPLE 9

A mixture is prepared by combining the following ingredients in a 1 mm ID mixing tee at 15 psi to give a molar ratio of $Bi^{3+}$ to $VO_4^{3-}$ of 1.00:1.00.

(i) $Bi(NO_3)_3.5H_2O$ (80.0 g) dissolved in 400 ml of 2N $HNO_3$ and diluted to 800 ml with distilled water.

(ii) $Na_3VO_4$ (30.3 g) dissolved in 400 ml of 2N NaOH and diluted to 800 ml with distilled water.

Sufficient $HNO_3$ is added to ingredient (i) or NaOH to ingredient (ii) so that the pH of the mixture will be between 1.5 and 2.5. The mixture is squirted under 40 psi pressure into a 4 l beaker containing 1000 ml of distilled water which had been adjusted to pH 3.3 with 2N $HNO_3$. The gel suspension is stirred for a minute and the pH adjusted to 3.3 with 0.5N NaOH. The mixture is stirred for 10 minutes at pH = 3.3. About 1300 ml of the mixture is removed and identified as Sample H in Table V. The remainder of the mixture, identified as Sample J, is filtered and washed twice with ~500 ml of distilled water.

Sample H is diluted to 2000 ml, pH is adjusted to 3.3, heated at 100° C for 4 hrs. to convert the gel to crystalline material, filtered, washed and dried at 110° C.

Sample J is converted according to procedure of Sample H except for 3 hrs. instead of 4. The crystalline material is filtered, washed and dried at 110° C.

Sample K is prepared by the procedure of Sample H except 88.0 g $Bi(NO_3)_3.5H_2O$ is used and $Na_3VO_4$ is prepared from $V_2O_5$ and NaOH. This gives a molar ratio of $Bi^{3+}$ to $VO_4^{3-}$ of 1.10:1.00. The gel suspension is divided in half. One-half retains identification Sample K; the other half is identified Sample L.

Sample K gel suspension pH is adjusted to 3.2, temperature is raised to 98°-100° C for 2½ hours, pH is maintained at 3.3. Product is filtered, washed and dried at 140° C.

Sample L is filtered and resuspended in distilled water to give 700 ml volume. Sample L is converted, filtered, washed and dried by the procedure of Sample K.

This example shows that where the molar ratio of $Bi^{3+}$ to $VO_4^{3-}$ is equal to or greater than 1.00:1.00, $NaNO_3$ need not be removed and a basic wash is not required.

TABLE V

| Sample | $Bi^{3+}$ to $VO_4^{3-}$ Molar Ratio | % $NaNO_3$ (a) | Base Wash | (pH) | Intensity % Green Filter Reflectance | Lightfastness % Fade-Ometer® Darkening (b) |
|---|---|---|---|---|---|---|
| A | .95 | 210 | Yes | 8.5 | 48.9 | 4.1 |
| B | " | 44 | No | | 39.0 | 21.3 |
| C | " | 44 | Yes | 9.0 | 50.2 | 7.0 |
| D | " | 7 | No | | 48.5 | 16.9 |
| E | " | 7 | Yes | 9.0 | 71.8 | 6.8 |
| F | .98 | 44 | No | | 52.9 | 5.1 |
| G | " | 7 | " | | 50.3 | 9.7 |
| H | 1.00 | 210 | " | | 67.4 | 4.3 |
| J | " | 7 | " | | 69.3 | 4.6 |
| K | 1.10 | 210 | " | | 74.1 | 4.7 |
| L | 1.10 | 44 | " | | 73.1 | 8.0 |

(a) Based on weight of product.
(b) Percent reflectance change after 44 hours of Fade-Ometer® exposure.

What is claimed is:

1. A process for preparing a pigmentary bright primrose yellow monoclinic bismuth vanadate comprising:

A. mixing a solution of $Bi(NO_3)_3.5H_2O$ in nitric acid with a solution of alkali vanadate in an aqueous base selected from sodium hydroxide and potassium hydroxide, to precipitate a bismuth vanadate gel suspended in a solution containing dissolved alkali nitrate, wherein the molar ratio of $Bi^{3+}$ to $VO_4^{3-}$ is from about 0.90:1.00 to 1.10:1.00, and wherein the normalities of the acid and base solutions are adjusted prior to mixing so that the pH of the mixture will be from about 1.0 to 11.0;

B. adjusting the pH of the suspension to about 2.2–6.0 with an aqueous base selected from sodium hydroxide and potassium hydroxide if the pH is less than about 2.2, or with an acid selected from nitric acid or sulfuric acid if the pH is greater than about 6.0;

C. removing the gel from the suspension;

D. washing the gel with water until it contains about 10 percent or less alkali nitrate, based on the theoretical yield of bismuth vanadate;

E. heating the gel in water at about 60°–200° C. for at least about 0.2 hour adjusting the pH of the suspension, if necessary, to about 2.2–6.0 with an aqueous base selected from sodium hydroxide and potassium hydroxide if the pH is less than about 2.2, or with an acid selected from nitric acid, hydrochloric acid, hydrobromic acid, sulfuric acid, or phosphoric acid if the pH is greater than 6.0 to convert it to monoclinic bismuth vanadate pigment;

F. adjusting the pH of the suspension to 8.0 to 9.5 with an aqueous base selected from sodium hydroxide or potassium hydroxide and holding at this pH at a temperature of 50°–100° C for fifteen to thirty minutes; and G. filtering, washing and drying the pigment.

2. The process of claim 1 wherein the molar ratio of $Bi^{3+}$ to $VO_4^{3-}$ is from about 0.90:1.00 to 1.00:1.00.

3. The process of claim 1 wherein the molar ratio of $Bi^{3+}$ to $VO_4^{3-}$ is from about 0.98:1.00 to 1.00:1.00.

4. The process of claim 2 wherein the pH in Step B is adjusted to about 3.0–3.5 and maintaining the pH at 3.0–3.5 in Step E.

5. The process of claim 4 wherein the gel is heated in water at about 90°–100° C for about 1–2 hours.

6. The process of claim 4 wherein the pH of the suspension is adjusted to 9.0 and the suspension held at 70° C for fifteen minutes in Step F.

7. The process of claim 4 wherein the normalities of the acid and base solutions in Step A are adjusted prior to mixing so that the pH of the mixture will be from about 1.5 to 4.

8. A process for preparing a pigmentary bright primrose yellow monoclinic bismuth vanadate comprising:
   A. mixing a solution of $Bi(NO_3)_3 \cdot 5H_2O$ in nitric acid with a solution of alkali vanadate in an aqueous base selected from sodium hydroxide and potassium hydroxide, to precipitate a bismuth vanadate gel suspended in a solution containing dissolved alkali nitrate, wherein the molar ratio of $Bi^{3+}$ to $VO_4^{3-}$ is from about 0.98:1.00 to 1.00:1.00, and wherein the normalities of the acid and base solutions are adjusted prior to mixing so that the pH of the mixture will be from about 1.5 to 4;
   B. adjusting the pH of the suspension to about 3.0–3.5 with an aqueous base selected from sodium hydroxide and potassium hydroxide if the pH is less than about 3.0, or with an acid selected from nitric acid or sulfuric acid if the pH is greater than about 3.5;
   C. removing the gel from the suspension;
   D. washing the gel with water until it contains about 10 percent or less alkali nitrate, based on the theoretical yield of bismuth vanadate;
   E. heating the gel in water at about 90°–100° C for about one to two hours adjusting the pH of the suspension, if necessary, to about 3.0–3.5 with an aqueous base selected from sodium hydroxide and potassium hydroxide if the pH is less than about 3.0, or with an acid selected from nitric acid, hydrochloric acid, hydrobromic acid, sulfuric acid, or phosphoric acid if the pH is greater than 3.5 to convert it to monoclinic bismuth vanadate pigment;
   F. adjusting the pH of the suspension to 9.0 with an aqueous base selected from sodium hydroxide or potassium hydroxide and holding at this pH at a temperature of 70° C. for fifteen to thirty minutes; and
   G. filtering, washing and drying the pigment.

9. A process for preparing a pigmentary bright primrose yellow monoclinic bismuth vanadate comprising:
   A. mixing a solution of $Bi(NO_3)_3 \cdot 5H_2O$ in nitric acid with a solution of alkali vanadate in an aqueous base selected from sodium hydroxide and potassium hydroxide, to precipitate a bismuth vanadate gel suspended in a solution containing dissolved alkali nitrate, wherein the molar ratio of $B^{3+}$ to $VO_4^{3-}$ is from about 1.00:1.00 to 1.10:1.00, and wherein the normalities of the acid and base solutions are adjusted prior to mixing so that the pH of the mixture will be from about 1.0 to 11.0;
   B. adjusting the pH of the suspension to about 2.2–6.0 with an aqueous base selected from sodium hydroxide and potassium hydroxide if the pH is less than about 2.2, or with an acid selected from nitric acid or sulfuric acid if the pH is greater than about 6.0;
   C. removing all or a portion of the clear solution from the suspended gel and optionally washing the gel;
   D. heating the gel in water at about 60°–200° C. for at least about 0.2 hour adjusting the pH of the suspension, if necessary, to about 2.2–6.0 with an aqueous base selected from sodium hydroxide and potassium hydroxide if the pH is less than about 2.2, or with an acid selected from nitric acid, hydrochloric acid, hydrobromic acid, sulfuric acid, or phosphoric acid if the pH is greater than 6.0 convert it to monoclinic bismuth vanadate pigment; and
   E. adjusting the pH of the suspension to 8.0 to 9.5 with an aqueous base selected from sodium hydroxide or potassium hydroxide and holding at this pH at a temperature of about 50°–100° C. for about fifteen to thirty minutes; and
   F. filtering, washing and drying the pigment.

10. The process of claim 9 wherein the molar ratio of $Bi^{3+}$ to $VO_4^{3-}$ is from about 1.00:1.00 to 1.05:1.00.

11. The process of claim 9 wherein the pH in Step B is adjusted to about 3.0–3.5 and maintaining the pH at 3.0–3.5 in Step D.

12. The process of claim 9 wherein the gel is heated in water at about 90°–100° C. for about 1–2 hours.

13. The process of claim 9 wherein the normalities of the acid and the base solutions are adjusted prior to mixing so that the pH of the mixture will be from about 1.5 to 4.

14. A process for preparing a pigmentary bright primrose yellow monoclinic bismuth vanadate comprising:
   A. mixing a solution of $Bi(NO_3)_3 \cdot 5H_2O$ in nitric acid with a solution of alkali vanadate in an aqueous base selected from sodium hydroxide and potassium hydroxide, to precipitate a bismuth vanadate gel suspended in a solution containing dissolved alkali nitrate, wherein the molar ratio of $Bi^{3+}$ to $VO_4^{3-}$ is from about 1.00:1.00 to 1.1:1.00, and wherein the normalities of the acid and base solutions are adjusted prior to mixing so that the pH of the mixture will be from about 1.5 to 11.
   B. adjusting the pH of the suspension to about 2.2–6.0 with an aqueous base selected from sodium hydroxide and potassium hydroxide if the pH is less than about 2.2 or with an acid selected from nitric acid or sulfuric acid if the pH is greater than about 6.0;
   C. removing the gel from the suspension;
   D. washing the gel with water;
   E. heating the gel in water at about 60°–200° C. for greater than about 0.2 hour, adjusting the pH of the suspension, if necessary, to about 2.2–6.0 with an aqueous base selected from sodium hydroxide and potassium hydroxide if the ph is less than about 2.2, or with an acid selected from nitric acid, hydrochloric acid, hydrobromic acid, sulfuric acid, or phosphoric acid if the pH is greater than 6.0 to convert it to monoclinic bismuth vanadate pigment; and
   F. filtering, washing and drying the pigment.

15. The process of claim 14 wherein the amount of alkali nitrate retained in the gel is less than 10% based on the theoretical yield of bismuth vanadate.

16. The process of claim 15 wherein the molar ratio of $Bi^{3+}$ to $VO_4^{3-}$ is from about 1.00:1.00 to 1.05:1.00.

17. The process of claim 15 wherein the pH in Step B is adjusted to about 3.0–3.5 and maintaining the pH at 3.0–3.5 in Step E.

18. The process of claim 15 wherein the gel is heated in water at about 90°–100° C. for about one to two hours.

19. The process of claim 15 wherein the normalities of the acid and the base solutions are adjusted prior to mixing so that the pH of the mixture will be from about 1.5–4.

20. The process for preparing a pigmentary bright primrose yellow monoclinic bismuth vanadate comprising:
A. mixing a solution of $Bi(NO_3)_3 \cdot 5H_2O$ in nitric acid with a solution of alkali vanadate in an aqueous base selected from sodium hydroxide and potassium hydroxide, to precipitate a bismuth vanadate gel suspended in a solution containing dissolved alkali nitrate, wherein the molar ratio of $Bi^{3+}$ to $VO_4^{3-}$ is from about 1.00:1.00 to 1.10:1.00, wherein the normalities of the acid and base solutions are adjusted prior to mixing so that the pH of the mixture will be from about 1.0 to 11.0:
B. ajusting the pH of the suspension to about 2.2–6.0 with an aqueous base selected from sodium hydroxide and potassium hydroxide if the pH is less than about 2.2, or with an acid selected from nitric acid or sulfuric acid if the pH is greater than about 6.0;
C. heating the suspension at about 60°–200° C. for at least about 0.2 hour, adjusting the pH of the suspension, if necessary, to about 2.2–6.0 with an aqueous base selected from sodium hydroxide and potassium hydroxide if the pH is less than about 2.2 or with an acid selected from nitric acid, hydrochloric acid, hydrobromic acid, sulfuric acid, or phosphoric acid if the pH is greater than 6.0 to convert it to monoclinic bismuth vanadate pigment; and
D. filtering, washing, and drying the pigment.

21. The process of claim 20 wherein the molar ratio of $Bi^{3+}$ to $VO_4^{3-}$ is from about 1.00:1.00 to 1.05:1.00.

22. The process of claim 20 wherein the pH in Step B is adjusted to about 3.0–3.5 and maintaining the pH at 3.0–3.5 in Step C.

23. The process of claim 20 wherein the gel is heated in water at about 90°–100° C. for about one to two hours.

24. The process of claim 20 wherein the normalities of the acid and base solutions are adjusted prior to mixing so that the pH of the mixture will be from about 1.5–4.

* * * * *